United States Patent [19]
Craig

[11] 3,942,615
[45] Mar. 9, 1976

[54] MULTI-SPEED HUB WITH BRAKE

[76] Inventor: Dennis K. Craig, 8620 Pine Ave., Niagara Falls, N.Y. 14304

[22] Filed: Jan. 20, 1975

[21] Appl. No.: 542,356

Related U.S. Application Data

[63] Continuation of Ser. No. 435,711, Jan. 23, 1974, abandoned.

[52] U.S. Cl. ............................. 192/6 A; 74/217 B
[51] Int. Cl.² ................................. F16D 23/00
[58] Field of Search .................. 192/6 A, 6 R, 64; 74/217 B

[56] References Cited
UNITED STATES PATENTS

| | | | |
|---|---|---|---|
| 2,215,965 | 9/1940 | Kurzina | 192/6 R |
| 2,741,934 | 4/1956 | Douglas | 192/6 A |
| 2,972,908 | 2/1961 | Hood et al. | 192/6 A |
| 3,252,552 | 5/1966 | Gleasman et al. | 192/6 R |
| 3,448,628 | 6/1969 | Shimano et al. | 192/6 A |
| 3,650,363 | 3/1972 | Cristie | 192/6 A |

*Primary Examiner*—Benjamin W. Wyche
*Attorney, Agent, or Firm*—Ashlan F. Harlan, Jr.

[57] ABSTRACT

A multi-speed bicycle hub that provides means permitting only limited reverse movement of the hub by backwards motion of any of the attached driving wheel sprockets by a clutch and which provides a brake operated by substantial reverse movement of the sprockets.

1 Claim, 3 Drawing Figures

MULTI-SPEED HUB WITH BRAKE

This is a continuation of application Ser. No. 435,711, filed Jan. 23, 1974 and now abandoned.

SUMMARY OF THE INVENTION

BACKGROUND OF THE INVENTION

The invention of the present application is concerned with bicycles and it particularly relates to bicycles having multi-speed drives such as those with 5, 10 or 15 speeds. Bicycles of this type are desirable since they permit the use of a relatively constant pedaling speed whether going uphill or on the level and are thus more efficient and less tiring for the rider. However, they do normally have certain objectionable features. For example, disengagement of the drive chain from the drive wheel sprockets is likely to occur if the pedals are operated backwards. Such disengagement requires the rider to dismount and replace the drive chain. Also, since they noramlly are equipped with hand-operated brakes frictionally engaging the wheel rims, they require hand movement on the operating levers to slow or stop and this is awkward in some situations.

It is, therefore, an object of the present invention to provide means associated with the drive wheel which prevents or minimizes the tendency of the drive chain to become disengaged from the drive wheel sprockets by preventing appreciable movement of the pedals in a reverse direction and thus preventing backward movement of the chain. It is also an object of the invention to provide, with multi-speed drives, foot operated braking mechanism.

SUMMARY OF THE INVENTION

The improvements of the present invention comprise the provision in the hub of a bicycle driving wheel of means that permits only limited reverse movement of the hub by backwards motion of any of the attached driving wheel sprockets. This is accomplished by providing the wheel with a hub having a clutch which disengages the sprockets from the drive wheel when there is relative reverse movement between the sprockets and the wheel, e.g. because of failure to drive the sprockets by pedaling or because of slight reverse movement of the drive wheel sprockets. The invention also comprises means to apply a brake to the wheel upon further reverse movement of the sprockets.

SHORT DESCRIPTION OF THE DRAWINGS

DESCRIPTION OF THE INVENTION

Figure 1:
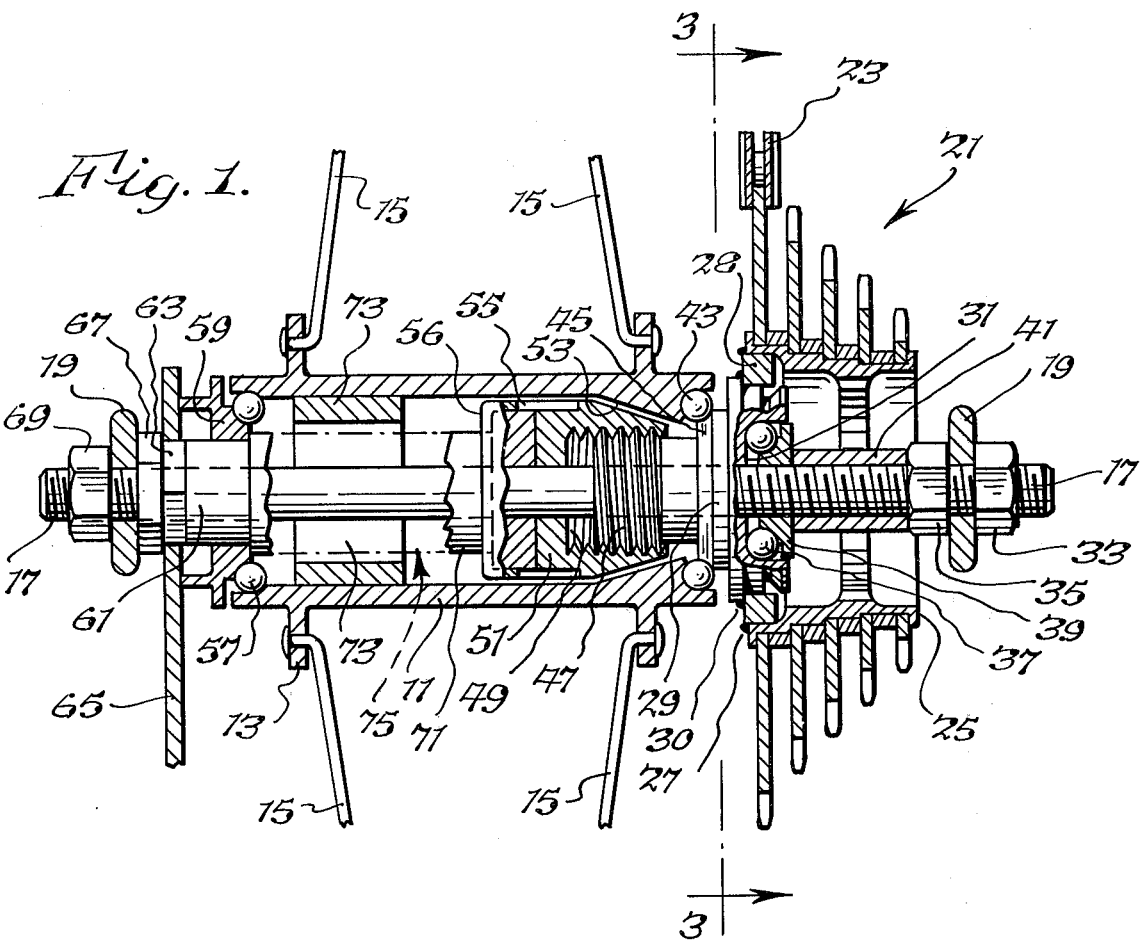
FIG. 1 is a sectional view of the rear wheel hub, axle and sprocket assembly of a bicycle incorporating the present invention, with portions illustrated schematically.

As best shown in FIG. 1, the bicycle driving wheel hub of the present invention comprises a rotatable, generally cylindrical, sleeve member 11. To this member are secured, conveniently by connection to a pair of perforated, annular flanges 13 carried by said member, a plurality of wire spokes 15 which are connected to and support at their other ends (not shown) the rim (not shown) of the rear bicycle wheel. The annular flanges 13 are longitudinally spaced on the sleeve member 11 and are preferably integral therewith. The spokes 15 are arranged in two spaced sets according to conventional practice and are detachably held in annular array in the spaced perforations in the flanges 13. Extending longitudinally through the sleeve member 11 and projecting from the ends thereof is a spindle or axle 17 that is solid and is threaded for a substantial distance from each end, on which spindle, by means hereinafter described, the sleeve member 11 and rear wheel are mounted for rotation.

The mechanism as illustrated in FIG. 1 is positioned as it would be seen from behind the driving wheel of the bicycle, looking forward toward the pedals and the front wheel. The terms "right" and "left" and similar terms of direction or position as used hereinafter refer, for convenience in description and reference, to the positions of the several elements as shown in FIG. 1. Such terms should not, however, be so construed as to imply any particular positioning of the bicycle or as to limit the scope of the present invention.

The frame of the bicycle extends in a direction normal to the spindle or axle 17 and the numeral 19 designates the two frame drop-outs by which the rear wheel is attached, on opposite sides, to the frame, thereby supporting and positioning it properly. Operation of the mechanism illustrated in FIG. 1 is brought about by rotation of the sprocket cluster 21 through movement of the endless chain 23. The chain 23 engages the teeth on the periphery of a selected one of the sprockets in the cluster 21 and rotates the cluster in response to rotation of the front sprocket or sprockets (not shown) one of which is also engaged by the chain 23. Pedals (not shown) actuated by the feet of the rider rotate the front sprocket or sprockets through cranks (not shown). It will be understood that the details of the front sprocket or sprockets, there normally being a plurality on multi-speed bicycles having a rear sprocket cluster, and the operation of such sprockets form no part of the present invention except as movement of the sprocket cluster 21 is caused by movement of the chain 23 and this results from movement of a front sprocket. Accordingly, any desired or convenient available construction can be employed therefor.

As shown in FIG. 1, the sprocket cluster 21, which is rotatably mounted on axle 17, is provided with five sprockets of graduated size assembled in conventional manner on a tubular hub 25. Such an arrangement is commonly used on 5, 10, and 15 speed bicycles. The cluster 21, through the hub 25, is rigidly secured and fixed, as by weld beads 27, to a mounting ring 28. The latter is rigidly secured, as by welds 30, to the outer end of a driver 29 around the annular bearing cup 31 formed therein. The axle 17 extends and projects outwardly from the hub 25 through the driver, the sprocket cluster, and the frame drop-outs 19. It is secured in the right side drop-out by the nuts 33 and 35 threadedly engaging on the axle and clamping the frame. A suitable ball bearing, with balls 37, which may be held in a retainer or cage (not shown), provides for free rotation of the sprocket cluster 21 and attached driver 29 on the spindle 17. The bearing is held in the cup 31 by the adjusting cone 39 which, preferably, threadedly engages the axle 17. Proper spacing of the sprocket cluster 21 from the frame is achieved by providing between the adjusting cone 39 and the nut 35 one or more spacers 41 of the desired length which may, if desired, be threadedly engaged on the spindle

17.

As explained above, the driver 29 is rotatable with respect to the axle 17. It also may rotate with respect to the sleeve member 11 of the wheel hub, the right end of the member 11 being rotatably supported on the driver by a suitable ball bearing. The balls 43 of this bearing may be mounted in a retainer or cage (not shown) and revolve in an annular race formed in the right end of the sleeve 11. They are held in place by an annular cone 45 formed on the periphery of the driver. The driver at its left end, inside the sleeve member 11, is provided with external threads 47 that are threadedly received in an axial bore 49 of a cylindrical clutch cone 51 which is slidably and rotatably mounted on the shaft or spindle 17 and has a peripheral conical surface that may engage with a corresponding annular conical surface 53 on the interior of the sleeve or hub 11. At its inner end the periphery of the clutch cone 51 is engaged by fingers 55 of annular spring means 56 to prevent free rotation of the clutch cone and maintain it in engagement with the driver 29.

At its left end the hub member 11 is rotatably supported on the axle 17 by a suitable ball bearing, the balls 57 of which revolve in a race provided in the interior annular surface of the hub end and are held in place by a cone member 59. The latter surrounds a member 61 that is part of the brake mechanism and which is threadedly engaged on the spindle 17 where it is held against rotation by engagement of a non-circular portion 63 at its outer end in a correspondingly shaped hole through a brake arm 65 that is, in turn, held against rotation by attachment (by conventional means not shown) to the frame of the bicycle. The brake arm 65 and cone member 59 are held in place on the brake member 61 and the axle 17 is secured in the left hand drop-out 19 of the frame by the nuts 67 and 69 on the axle.

The operation of the present novel device is simple. The axle or spindle 17 is clamped in the frame of the bicycle so that it is non-rotatable. The sprockets of the sprocket cluster 21 are adapted to be engaged selectively by the drive chain 23, the selection being made by the rider and accomplished by suitable means (not shown) such as aany convenient type of derailleur gear. The sprocket cluster 21 is on the right side of the hub looking forward toward the crank and front wheel (not shown). Consequently, for forward motion of the bicycle the cluster is driven clockwise (as viewed in elevation from the right end) by the chain, the latter being moved by a front sprocket (not shown) as a result of application of force by the rider to the pedals (not shown). When so rotated, the cluster 21 revolves on the bearing balls 37 and rotates the driver 29, to which it is attached by welds 27 and 30, as a unit therewith. Clockwise rotation of the driver causes the external threads 47 thereon, by coaction with the internal threads in the bore 49 of the clutch cone 51, to pull the latter to the right, thus engaging the conical circumferential surface on the clutch cone with the internal conical surface 53 of the hub 11 and producing forward rotation of the hub 11 and the rear, driving wheel of the bicycle which is carried thereby on spokes 15.

Upon cessation of clockwise rotation of the sprocket cluster 21 caused, for example, by the rider ceasing to pedal forwardly, the continued rotation of the hub 11 causes the clutch cone 51 to rotate with respect to the now-stationary driver 29, thereby causing the cone to move to the left on the threads 47 of the driver and disengage the contacting clutch faces. Thus, free rotation of the hub 11 on the bearing balls 43 and 57 is permitted. The driver and clutch cone then have substantially the relative positions shown illustrated in FIG. 1 and the bicycle can coast without movement of the pedals by the rider.

Figure 2:
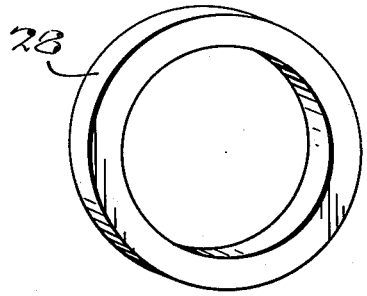
FIG. 2 is a perspective view of a mounting ring for the multisprocket cluster.
Figure 3:
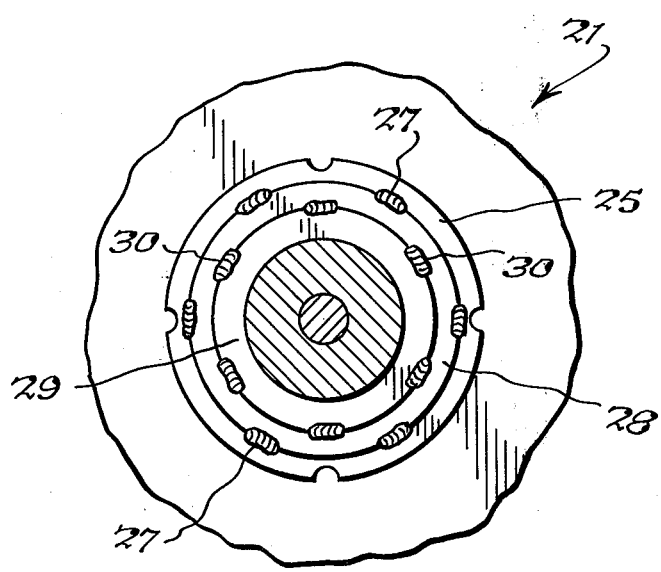
FIG. 3 is a fragmentary sectional view on line 3—3 of FIG. 1.

If the sprocket cluster 21 is rotated counter-clockwise from the position shown in FIG. 1, the driver 29 is caused to rotate counterclockwise, thus moving the clutch cone 51 to the left and moving the brake member 71 whereby to cause braking of the bicycle by friction of the brake shoes 73 on the inner surface of the sleeve member 11. The precise mechanism by which this is accomplished is not important and there are available commercially several braking mechanisms, for example, the mechanism illustrated in FIGS. 1 and 2 of Gleasman et al., U.S. Pat. No. 3,252,552, issued May 24, 1966, which those skilled in the art may employ as desired. Consequently, the brake actuation mechanism which includes the members 61 and 71 is only illustrated schematically in broken lines and generally designated by the numeral 75. Obviously, when clockwise rotation of the sprocket cluster is resumed, the brake will be deactivated and on continued clockwise rotation the clutch will again engage to produce forward motion of the bicycle.

It will be apparent that by the present invention the problems mentioned above encountered with multi-speed bicycles will be eliminated while the multi-speed capabilities and convenience will be maintained.

It will be understood that certain specific details of the invention as illustrated and described are subject to modification. Accordingly, it is intended that the invention should be construed as broadly as permitted by the appended claims.

I claim:

1. A multi-speed gear hub assembly with brake for a bicycle or the like which comprises: an axle carried by the frame of said bicycle and held against rotation; a driving wheel hub rotatably mounted on said axle; a clutch cone within said hub and movable longitudinally therein alternatively to engage said hub for causing said hub to rotate or to actuate braking mechanism which includes laterally movable brake shoes in said hub; a driver rotatably mounted directly on said axle and threadedly engaging said clutch cone, whereby to move said cone in a selected longitudinal direction upon rotation of said driver, said driver projecting axially from said hub; a sprocket cluster having a tubular hub wholly outside said first mentioned hub and rotatably mounted on said axle; and a mounting ring concentric with said driver and said tubular hub surrounding the outer end of said driver and carried in said tubular hub, said mounting ring being welded to said driver and to said tubular hub, whereby said driver and said sprocket cluster are caused to rotate together.

* * * * *